INVENTOR:
George W. Albrecht
BY Edward J. Norton
Attorney

United States Patent Office 3,495,098
Patented Feb. 10, 1970

3,495,098
SYNCHRONOUS SYMMETRICAL A.C. SWITCH
George W. Albrecht, Mountaintop, Pa., assignor to RCA Corporation, a corporation of Delaware
Filed Jan. 10, 1967, Ser. No. 608,309
Int. Cl. H03k 17/02
U.S. Cl. 307—252       5 Claims

ABSTRACT OF THE DISCLOSURE

There is disclosed a switching circuit for use with an alternating current source to supply a load device. By combining a switching element, a time constant circuit, and a selectively operable by-passing element, a switching circuit is provided which is capable of supplying a load with an integral number of alternating current cycles, switched in a synchronous manner.

---

This invention relates generally to switching circuits and more particularly to an improved switching circuit which exhibits the qualities of being synchronous and symmetrical in operation.

One of the major problems frequently encountered in the use of alternating current switching circuits is to provide a switching circuit which will turn on and off at times which correspond to minimum values of the alternating current supply so as to avoid the generation of switching transients and the electrical interference associated therewith. A further problem often encountered is associated with the inherent characteristics of certain loads, particularly those exhibiting magnetic characteristics, whereby it is often necessary to supply the load with an integral number of alternating current cycles so that the load does not remain in a saturated state should the current therethrough be discontinued in the midst of a cycle of alternating current supply.

Accordingly it is an object of this invention to provide an improved switching circuit which substantially avoids the generation thereby of switching transients and the electrical interference associated therewith.

A further object of the present invention is to provide an improved switching circuit which will supply a load with an integral number of alternating current cycles.

In accordance with one embodiment of this invention the terminal electrodes of a controlled bi-directional switching device, such as a triac, are connected in series with a load across a pair of input terminals to which a source of alternating current may be connected. A time constant circuit for triggering the control (gate) electrode of the triac is connected across the control electrode and the load. The time constant circuit cooperates with the triac such that it charges during a given positive half cycle of the alternating current when the triac has been triggered into its first conductive state and discharges into the control electrode of the triac during the next half cycle of the alternating current thereby triggering the triac into conduction in the opposite direction. In the absence of any action to cause a contrary result, such operation will be repetitive in nature and the supply to the load will be continuous. To enable the circuit to discontinue operation in the desired manner, a unidirectional control device, for example, a silicon controlled rectifier (SCR) is shunted across the time constant circuit such that when a signal is applied to the gate of the SCR, and the potential at the anode of the SCR is positive with respect to its cathode, the SCR switches into its conductive state thereby short circuiting the load and preventing the time constant circuit from further charging. The absence of any charge upon the time constant circuit, which serves to trigger the control electrode of the triac, prevents further operation of the circuit even when the SCR is rendered nonconductive as a result of the reversal of polarity at the anode and cathode terminals so long as a signal is maintained at its gate so as to permit it to be rendered conductive when the potential at its anode again becomes positive with respect to its cathode.

The operation of the circuit is such that the triac remains nonconductive, and the load inoperative, so long as a control signal is applied to the gate of the SCR. Upon the removal of the control signal from the gate of the SCR, the triac will be triggered into conduction during the initial portion of the next positive half cycle of alternating current thereafter occurring. The triac will continue to conduct current first in one direction and then in the other, depending on the polarity of the alternating current across its terminal electrodes, until such time that a control signal is re-applied to the gate of the SCR. Thereafter the triac will remain conductive only until the initial portion of the succeeding positive half cycle of alternating current at which time the SCR will again become conductive and short circuit both the triac and the load.

As a result of the fact that the triac and the SCR are switched into their respective conductive states at or very near the beginning of any half wave of alternating current, any transients caused by the switching of the circuit are kept to a minimum and electrical interference resulting therefrom is substantially eliminated.

Furthermore, because the triac is always initially triggered into its conductive state only upon the application of a given positive half cycle of alternating current and remains in one of its conducting states only until the first positive half cycle of alternating current next succeeding the application of the control signal to the gate of the SCR, the load is always exposed to an integral number of alternating current wave forms.

The present invention will be more fully understood when the following description is read in conjunction with the acompanying figures wherein like reference numerals indicate like elements and in which.

Figure 2:
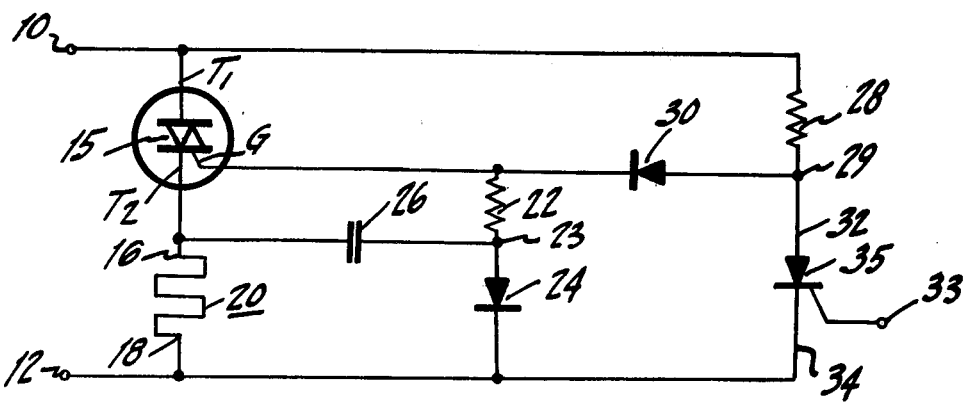
FIGURE 2 is a circuit diagram representing one embodiment of a circuit employing the present invention.
Figure 3:
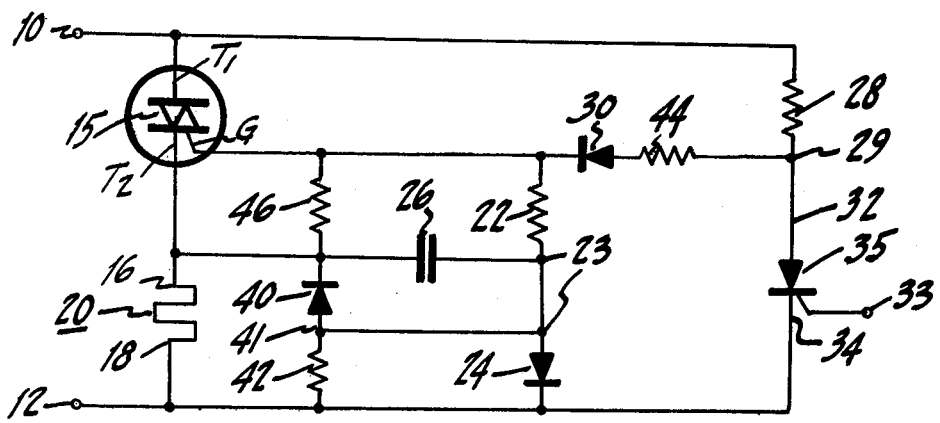
FIGURE 3 is a circuit diagram of a further embodiment of the present invention.

Before proceeding further with a detailed explanation of the operation of the embodiments of the present invention represented by FIGURES 2 and 3 it would perhaps be advisable to set forth a cursory description of the nature of the operation of the semiconductor element used in these embodiments and referred to therein as a triac.

Triac is a generic term which has been coined to identify the A.C. semiconductor switch equivalent of the triode.

As a semiconductor device the triac operates in a manner similar to the silicon control rectifier (SCR). Both are triggered into conduction upon the application of a signal to its control or "gate" electrode when a given potential difference exits across the terminal electrodes of the device, and remain in a conductive state until the potential across their terminal electrodes drop below a predetermined value. The significant distinction between the triac and the SCR is that the triac is capable of conducting current in two directions while the SCR is capable of conducting current in only one direction.

Figure 1:
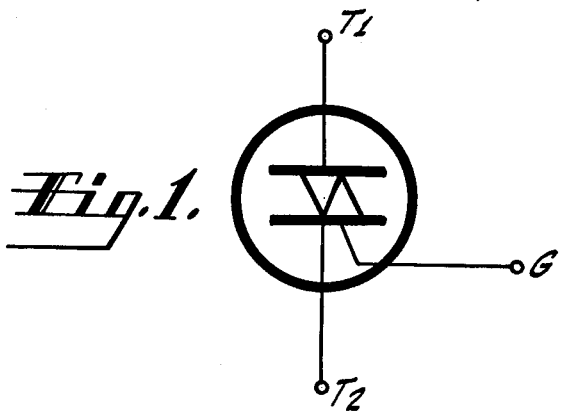
FIGURE 1 is a circuit representation of a triac, as used in this application.

FIGURE 1 represents the circuit symbol for the triac. When the potential difference across terminals $T_1$ and $T_2$ is such that $T_1$ is positive with respect to $T_2$, the application of a signal to the control electrode G, of either positive or negative polarity with respect to $T_2$, will switch the device into a conducting state such that conventional current will flow from $T_1$ to $T_2$. Furthermore, when the potential difference across terminals $T_1$ and $T_2$ is such that $T_1$ is negative with respect to $T_2$, the application of either a positive or negative signal to the control electrode G will cause the device to switch into a conducting state such that conventional current flows from $T_2$ to $T_1$. Wherefrom it can be seen that the triac is capable of operating, with varying degrees of sensitivity, in any one of the following modes (all polarities are taken with $T_2$ as the point of reference potential):

| Mode | $T_1$ | G |
| --- | --- | --- |
| One | Positive | Positive. |
| Two | do | Negative. |
| Three | Negative | Positive. |
| Four | do | Negative. |

Turning now to the embodiment of the present invention as represented in FIGURE 2, one terminal 10 of an alternating current supply is connected to terminal $T_1$ of a triac 15. Terminal electrode $T_2$ of the triac 15 is connected to one side 16 of the load 20 to be supplied and the second side 18 of the load 20 to be supplied is connected to the second terminal 12 of the alternating current supply. A first resistor 22 and a first diode 24 are connected in series in the order named across the control electrode G of the triac 15 and the second terminal 12 of the alternating current supply, the diode 24 being poled to conduct conventional current toward the second terminal 12. A capacitor 26 is connected between the junction 23 of resistor 22 and diode 24, and terminal electrode $T_2$ of the triac 15. A second resistor 28 and a second diode 30 are connected in series in the order named across terminal electrode $T_1$ of the triac 15 and the control electrode G of the triac 15, the diode 30 being poled to conduct conventional current toward the control electrode G. The anode 32 of a silicon controlled rectifier (SCR) 35 is connected to the junction 29 between resistor 28 and diode 30. The cathode 34 of the SCR 35 is connected to the second terminal 12 of the alternating current supply.

Referring now to the operation of the circuit described in FIGURE 2, when a control signal is applied to the gate electrode 33 of the silicon controlled rectifier 35, and the potential at terminal 10 becomes positive with respect to terminal 12, the SCR 35 is switched into its conductive state and conventional current flows from terminal 10 through the resistor 28, the SCR 35, and on to terminal 12, by-passing the triac 15 and the load 20. Thereafter, when the potential at terminal 10 swings negative with respect to terminal 12, diodes 30 and 24 as well as the SCR 35 are reversed biased and, since the triac 15 is in a nonconductive state, there exists no completed circuit through which current may flow.

To switch the circuit into an operating condition whereby the load 20 is supplied with power, the signal to the gate 33 of the SCR 35 must be discontinued, thereby preventing the SCR 35 from switching into its conductive state. Thereafter, when the potential at terminal 10 becomes positive with respect to terminal 12, the diode 30 becomes forward biased and switches into its conductive state permitting conventional current to pass through it and into the control electrode G of the triac 15 triggering the latter into a first conductive state corresponding to mode 1 previously described. Thereafter, and for the remaining portion of the positive half cycle of alternating current, conventional current flows from terminal 10 through the triac 15 and the load 20 to terminal 12. During this half cycle of alternating current diode 24 is also forward biased and capacitor 26 will charge therethrough to a value equal to the voltage drop across the load 20; the side of the capacitor 26 connected to terminal electrode $T_2$ of the triac 15 charging positive with respect to the side of the capacitor 26 connected to junction 23. At some point during this half cycle of the A.C. supply, i.e., when the potential at terminal 10 is positive with respect to terminal 12, the potential at the side of the capacitor 26 connected to junction 23 will become sufficiently negative with respect to the potential at the cathode of diode 24 to cause the diode 24 to switch into its nonconductive state, at which time the capacitor 26 will begin to discharge through resistor 22 and into the control electrode G of the triac 15. By properly selecting resistor 22 and capacitor 26 the discharge time of the RC circuit can be made sufficiently long so that when the alternating current reverses polarity, i.e., terminal 10 becomes negative with respect to terminal 12, the discharge current of the time constant circuit will trigger the triac 15 into a second conductive state corresponding to mode 4 previously described. The foregoing operations are continued and repeated during successive cycles of the A.C. supply.

To discontinue the supply of power to the load 20 a control signal need be applied to the gate 33 of the silicon controlled rectifier 35. Having so done, the SCR 35 will switch into its conductive state upon the application of the next positive half cycle of alternating current, i.e., terminal 10 positive with respect to terminal 12, thereby short-circuiting the load 20 and preventing the capacitor 26 from further charging. In the absence of a charge upon the capacitor 26, there is no source from which the control electrode G of the triac 15 can be supplied and triggered during successive negative half cycles.

The embodiment of the present invention represented by FIGURE 3 differs from that of FIGURE 2 by virtue of the following structural additions:

A third diode 40 and a third resistor 42 are connected in series in the order named across terminal 16 and terminal 18 of the load 20, the diode 40 being poled to conduct conventional current toward terminal 16 of the load 20. A common lead is connected between the junction 41 of resistor 42 and diode 40, and junction 23. A fourth resistor 44 is placed in series with the lead connecting junction 29 with diode 30. A fifth resistor 46 is connected across the control electrode G and the terminal electrode $T_2$ of the triac 15.

The circuit of FIGURE 3 operates in a manner quite similar to the circuit of FIGURE 2. The structural additions represent refinements which will be better understood after tracing the operation of the circuit as follows:

When a control signal is applied to the gate electrode 33 of the silicon controlled rectifier 35, and the potential at terminal 10 becomes positive with respect to terminal 12, the circuit operates in the manner previously discussed in reference to FIGURE 2. It is conceivable however, for the voltage drop across the SCR 35 to be as high as 2 volts. In FIGURE 2 this drop would also appear across the series combination comprising diode 30, resistor 22, and diode 24. Since the voltage drop across diode 30 would only be in the order of ½ a volt there exists the possibility that the remaining 1½ volt signal which appears at the control electrode G of the triac 15 would be sufficient to trigger the triac 15 into conduction. To avoid this undesirable result, resistors 44 and 46 are inserted in the circuit as shown, and complete a series path from junction 29 through resistor 44, diode 30, resistor 46, and the load 20. This path serves to attenuate the 2-volt drop such that the major portion of the drop occurs across resistor 44 and diode 30 thereby eliminating the possibility of prematurely triggering the triac 15.

In the absence of a control signal applied to the gate 33 of the SCR 35, the triac 15 will be switched into a conductive state upon the application of the first positive half cycle of alternating current to terminal 10, i.e., with reference to terminal 12. As in the circuit of FIGURE 2 current will flow from terminal 10 through the triac 15 and the load 20, and capacitor 26 will charge through diode 24 to a value equal to the voltage drop across the load 20. The discharge path of the time constant circuit however, is altered as a result of the addition of resistor 42. The effect of resistor 42 is to reduce the discharge time of the constant circuit thereby preventing the capacitor 26 from discharging for a duration longer than the negative half cycle of alternating current, i.e., terminal 10 negative with respect to terminal 12. This prevents the triac 15 from triggering into a conductive state corresponding to mode two, after the application of a signal to the gate 33 of SCR 35. The absence of diode 40 would permit the capacitor 26 to charge through the resistor 42 during the period that current flowed through the load 20 from terminal 12 toward terminal 10. Since such current flow would charge the capacitor 26 with an undesired polarity the diode 40 is inserted to short circuit the capacitor 26 when the diode is forward biased; i.e., when terminal 10 is negative with respect to terminal 12.

The operation of circuits embodying the present invention is such that the triac is always switched into its conductive state during the initial portions of successive alternating current half cycles when the absolute magnitude of the potential across the terminal electrodes is very small; i.e., just after the potential of the A.C. source across the input terminals has passed through zero. Similarly the triac is always switched into its nonconductive states during the terminal portions of successive alternating current half cycles when the absolute magnitude of the potential across the terminal electrodes is very small; i.e., just as the potential of the A.C. source across the input terminals is approaching zero. As a result thereof switching transients, and the interference associated therewith, are substantially avoided. Furthermore, the triac is always initially triggered into its conductive state only upon the application of a given positive half cycle of alternating current and remains in one of its conducting states only until the first positive half cycle of alternating current next succeeding the application of a control signal to the gate of the SCR. Therefore, the load is always exposed to an integral number of alternating current wave forms.

Changes or additions can be made to the described circuits without digressing from the scope and spirit of the present invention. For example resistor 28 could be replaced by a variable impedance device, either active or passive, so as to coordinate with loads of various impedance; or diode 40 and resistor 42 could be replaced by a Zener diode. It is therefore intended that all matter contained in the foregoing description and shown in the accompanying diagrams be interpreted as illustrative and not in a limiting sense.

What is claimed is:

1. A synchronous symmetrical switching circuit comprising:
   (a) a controlled bi-directional gate device having a first terminal electrode, a second terminal electrode, and a control electrode, said device being rendered conductive in a first direction between said terminal electrodes when a signal of sufficient value and of a given polarity is applied to said control electrode and when a voltage above a first threshold value of insignificant magnitude and of one polarity is applied between said first and second terminal electrodes, said device being rendered conductive in the opposite direction between said terminal electrodes when a signal of sufficient value and of a given polarity is applied to said control electrode and when a voltage above a threshold value of insignificant magnitude and of a polarity opposite to said one polarity is applied between said terminal electrodes;
   (b) means for connecting a load device and an alternating current source in circuit with said terminal electrodes;
   (c) means for triggering said bi-directional gate device into conduction in said first direction upon the application of an alternatng current half cycle of said one polarity to said first terminal electrode of said gate device;
   (d) a capacitive time constant circuit;
   (e) means for charging said time constant circuit across said load device when said bi-directional gate device is conducting current in said first direction;
   (f) means connected to the control electrode of said bi-directional gate device for discharging said time constant circuit through said control electrode during the alternating current half cycle of polarity opposite to said one polarity next succeeding said alternating current half cycle of said one polarity causing said gate device to be triggered into conduction in said opposite direction; and
   (g) selectively operated means coupled to said gate device, said source, and said time constant circuit which, when effective, prevents said bi-directional gate device from being rendered conductive, said selectively operated means being rendered effective only in response to the application of the first alternating current half cycle of said one polarity which occurs subsequent to the operation of said selctively operated means.

2. A synchronous symmetrical switching circuit as described in claim 1 wherein said selectively operated means comprises a silicon controlled rectifier.

3. A synchronous symmetrical switching circuit comprising:
   (a) a semiconductor triac device having a first terminal electrode, a second terminal electrode, and a control electrode;
   (b) means for connecting a load device and an alternating current source in circuit with said terminal electrodes;
   (c) means for triggering said triac device into conduction in one direction upon the application of an alternating current half cycle of one polarity to said first terminal electrode of said triac device;
   (d) a capacitive time constant circuit;
   (e) means for charging said time constant circuit across said load device when said triac device is conducting current in said one direction;
   (f) means connected to the control electrode of said triac device for discharging said time constant circuit through said control electrode during the alternating current half cycle of polarity opposite to said one polarity next succeeding said alternating current half cycle of said one polarity causing said triac device to be triggered into conduction in the opposite direction; and
   (g) selectively operated means coupled to said triac device, said source, and said time constant circuit which, when effective, prevents said triac device from being rendered conductive, said selectively operated means being rendered effective only in response to the application of the first alternating current half cycle of said one polarity which occurs subsequent to the operation of said selectively operated means.

4. A synchronous symmetrical switching circuit as described in claim 3 wherein said selectively operated means comprises a silicon controlled rectifier.

5. A synchronous symmetrical switching circuit comprising:
   (a) a semiconductor triac device having a first terminal electrode, a second terminal electrode, and a control electrode;
   (b) a load device;
   (c) a first input terminal and a second input terminal adopted to be connected to a source of alternating current, said first input terminal being connected to said first terminal electrode of said triac device, said second input terminal being connected to one terminal of said load device, the other terminal of said load device being connected to the second terminal electrode of said triac device;

(d) a first resistor and a first diode connected in series in the order named across said first terminal electrode and said control electrode of said triac device, said first diode being poled to conduct conventional current toward said control electrode;

(e) a second resistor and a second diode connected in series in the order named across said control electrode of said triac device and said second input terminal, said second diode being poled to conduct conventional current toward said second input terminal;

(f) a capacitor having one of its terminals connected to the second terminal electrode of said triac device, and having its other terminal connected to the junction formed where said second resistor is joined to said second diode; and (g) a silicon controlled rectifier having an anode, a cathode, and a gate electrode, said anode being connected to the junction formed where said first resistor is joined to said first diode, and said cathode being connected to said second input terminal.

References Cited

UNITED STATES PATENTS

| | | | |
|---|---|---|---|
| 3,299,297 | 1/1967 | Motto | 307—324 |
| 3,328,606 | 6/1967 | Pinckaers | 307—305 |
| 3,335,291 | 8/1967 | Gutzwiller | 307—305 |
| 3,414,738 | 12/1968 | Gilbreath | 307—305 |

OTHER REFERENCES

General Electric Application Note, on "Triac for A.C. Power" 200.35, May 1964, p. 1–7.

DONALD D. FORRER, Primary Examiner

HAROLD A. DIXSON, Assistant Examiner

U.S. Cl. X.R.

307—305